US006347276B1

(12) United States Patent
Avery, Jr.

(10) Patent No.: US 6,347,276 B1
(45) Date of Patent: Feb. 12, 2002

(54) METHOD AND SYSTEM FOR REDUCING THE TIME REQUIRED TO POWER DOWN ENGINE CONTROLLER WITH FAULTY EEPROM

(75) Inventor: Richard M. Avery, Jr., West Bloomfield, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/661,141

(22) Filed: Sep. 13, 2000

(51) Int. Cl.[7] ............................ G06F 19/00; G06G 7/70

(52) U.S. Cl. ........................................ 701/112; 701/115

(58) Field of Search ................................. 123/352, 436, 123/179.4, 198 DB; 701/101, 102, 103, 112, 115

(56) References Cited

U.S. PATENT DOCUMENTS 5,732,676 A 3/1998 Weisman et al.
5,937,823 A * 8/1999 reeder et al. ................ 701/112
5,948,026 A * 9/1999 Beemer, II et al. ......... 701/115
5,999,876 A 12/1999 Irons et al.

* cited by examiner

*Primary Examiner*—Willis R. Wolfe
(74) *Attorney, Agent, or Firm*—Brooks & Kushman P.C.

(57) ABSTRACT

A method of limiting engine control delays in an internal combustion engine having an electronic engine controller with an electronically erasable programmable read-only memory (EEPROM) for storing data. A timer and/or a counter may be used to limit re-attempts to write data to the EEPROM upon engine shutdown. If a predetermined time set by the timer for writing to the EEPROM has been exceeded, the system terminates the engine shutdown data write and allows the controller to switch to its low power mode. The counter counts the number of unsuccessful attempts to write to the EEPROM. If the number of unsuccessful attempts to write to the EEPROM exceeds the predetermined number of attempts, the system indicates that there has been a gross failure of the EEPROM and allows the engine control module to be switched to the low power mode. Both a timer and counter may be employed in the system.

15 Claims, 2 Drawing Sheets

METHOD AND SYSTEM FOR REDUCING THE TIME REQUIRED TO POWER DOWN ENGINE CONTROLLER WITH FAULTY EEPROM

TECHNICAL FIELD

The present invention relates to engine control modules that write data to a EEPROM.

BACKGROUND ART

Many electronic devices use Electrically Erasable Programmable Read Only Memory (EEPROM) for storing computer programs and data. EEPROMs are an economical and flexible memory medium that have been widely accepted and are extensively used in many electronic devices.

One EEPROM application is in an engine control module to store computer programs, engine calibration data, and to accumulate data on engine operation and faults. One example of this application of an EEPROM chip may be found in Applicant's DDEC series of engine controllers.

One problem associated with EEPROM chips is that they have a life measured by the number of times data is written to specific cells in the EEPROM chip. The EEPROM chip itself may fail. Software has been developed to monitor EEPROM operation for the purpose of determining whether a particular cell or cells of the EEPROM are worn out. This software is not generally capable of indicating whether the entire EEPROM chip has failed. If a chip is not working, some monitoring software may indicate that all of the cells are bad requiring rewrites for every page. A page of data to be written in the EEPROM may be of varying byte sizes, for example 32 bytes or 128 bytes, that are all written at one time. The time required to rewrite over and over each page until the EEPROM runs out of space may take extremely long, for example, 10 to 30 minutes. Resuming normal operation of the controller may be delayed after engine shutdown until the engine shutdown data is written to the EEPROM which prevents an operator from restarting the engine during this time.

In some instances, the EEPROM chip may appear to be functioning while no data is actually being stored in it. During power down of an engine, the failure of the EEPROM to accept the writing of data delays the ECM power down. In accordance with normal ECM operation, after the ignition is turned off, all data must be stored before the ECM can power down. The operator in this situation may lose all of the engine shutdown data and would also be prevented from restarting the engine during this time. In addition, the system is prevented from storing fault information due to the inability of the EEPROM to store information.

These and other problems and disadvantages associated with prior art EEPROM based data logging systems for engine control modules is addressed by Applicant's invention as summarized below.

DISCLOSURE OF INVENTION

According to the present invention, a method is provided for limiting engine control delays caused by an inability of an electronically erasable programmable read-only memory (EEPROM) to store engine shutdown data upon engine shutdown. An engine controller has an operational mode when the engine is operating and a low power mode when the engine is shutdown. The method includes the step of detecting a shutdown condition when the engine controller is in the operational mode. For example, the engine controller may receive a request to shutdown the engine and switch to a low power mode by turning off the ignition switch. After detecting a shutdown command, a timer is enabled that is set to a predetermined time interval. Engine shutdown data is then written by the engine controller to the EEPROM. The controller checks as to whether the engine shutdown data was successfully written to the EEPROM before the predetermined time interval set by the timer expires. If the predetermined time interval expires, the engine controller will automatically terminate the data write operation and switch the engine control module to its low power mode.

According to another aspect of the invention, in addition to having a timer set to a predetermined interval, a counter may be provided that is incremented each time an unsuccessful attempt to write the data to EEPROM occurs. The engine controller generates a fault message when the counter exceeds a predetermined number of unsuccessful writing steps. The fault message is logged in a second nonvolatile memory storage device (other than the failed EEPROM) such as a flash ram device to report that the EEPROM is non-operational for subsequent servicing operations.

According to another aspect of the invention, a method is provided for limiting engine control delays in an internal combustion engine having an EEPROM in which a plurality of sets of engine shutdown data are stored. Delays caused by the inability of the EEPROM to store the sets of engine shutdown data are limited to permit the engine controller to be switched from an operational mode to a low power mode. When the engine controller receives a request to shutdown the engine, the engine controller writes one of the sets of engine shutdown data as required by the engine controller to the EEPROM to create a stored set of engine shutdown data. The next step in the process is to determine whether the writing step was unsuccessful by comparing the set of engine shutdown data to the stored set of engine shutdown data. If so, a counter is incremented and the controller determines whether the counter has exceeded a predetermined limit. If the predetermined limit has been exceeded, a fault message may be generated. If the counter has not exceeded the predetermined number, the writing step is repeated. If the counter has exceeded the predetermined number, the engine controller automatically terminates the data write operation and switches the engine control module to a low power mode.

Alternatively, if the writing step was successful, the counter is reset and it is then determined whether all sets of engine shutdown data have been recorded. If all sets of data have not been stored, the writing step is repeated. If all sets of engine shutdown data have been stored, the engine control module is switched to its low power mode. The above process may also include the use of a timer that is set to a predetermined time interval. If so, the process also includes the step of determining whether writing of the engine shutdown data was completed before expiration of the predetermined time interval.

The present invention may also be characterized as a method of providing engine control with engine operation data logging in an EEPROM. The method includes the steps of actuating an ignition switch to initiate engine controller operation. The system enables engine shutdown criteria in the engine controller. The system then determines whether the ignition switch is turned off and whether engine shutdown criteria have been met that would enable the system to generate a signal to stop the engine. As the controller waits for the engine to stop and other ignition off features to be completed, data is written to the EEPROM. A determination is made as to whether the data has been successfully written into the EEPROM. A counter is incremented if the data is not successfully written to the EEPROM to record a value representative of the number of unsuccessful attempts to write to the EEPROM memory. A fault message is generated when the value representative of unsuccessful attempts to write in EEPROM memory exceeds the predetermined value. If so, a fault message is stored in non-volatile memory and the engine control module is permitted to switch to a low power mode.

The method may also include further steps of initiating an EEPROM timer having a predetermined time period after the step of waiting for the engine to stop. The system determines whether the engine shutdown data writing step was completed before the predetermined time interval expires. The data write operation is automatically terminated and the engine control module is switched to a low power mode upon expiration of the predetermined time interval.

Another aspect of the method of the invention relates to controlling an internal combustion engine having an engine controller and an EEPROM with a plurality of cells for storing data. The system detects a gross failure of the memory when the controller attempts to write to the memory upon engine shutdown before entering a low power mode. The method comprises detecting an engine shutdown condition wherein the controller receives a request to shutdown the engine and switch to the low power mode. The controller executes a write command wherein the controller attempts to write a block of data to the memory in a specific block of cells that is stored as a stored block of data. The controller reads the stored block of data stored in the specified block of cells and compares the block of data to be stored with the stored block of data to confirm that the write command was successful. The system then determines whether the stored block of data is different from the block of data intended to be stored thereby confirming that the write command was unsuccessful and re-executing the write command subject to a "re-attempt limit" of write commands. The re-attempt limit may be established by a timer set to a predetermined time delay or may be set by a counter that counts the number of failed attempts until a predetermined number of failed write commands is reached. Upon reaching the re-attempt limit of write commands set by the timer or counter, it is determined that there was a gross failure of the memory.

According to other aspects of the method, the re-attempt limit may be set by both a timer and a counter wherein either exceeding the predetermined time limit or exceeding the number of failed attempts may cause the engine controller to indicate that there has been a gross failure of the memory. Upon determining that there has been a gross failure in memory, the system preferably records a fault message in non-volatile memory and also switches the controller to its low power mode.

These and other aspects and advantages of the present invention will be better understood in view of the attached drawings and the following written description of the invention.

BEST MODE FOR CARRYING OUT THE INVENTION

Figure 1A:
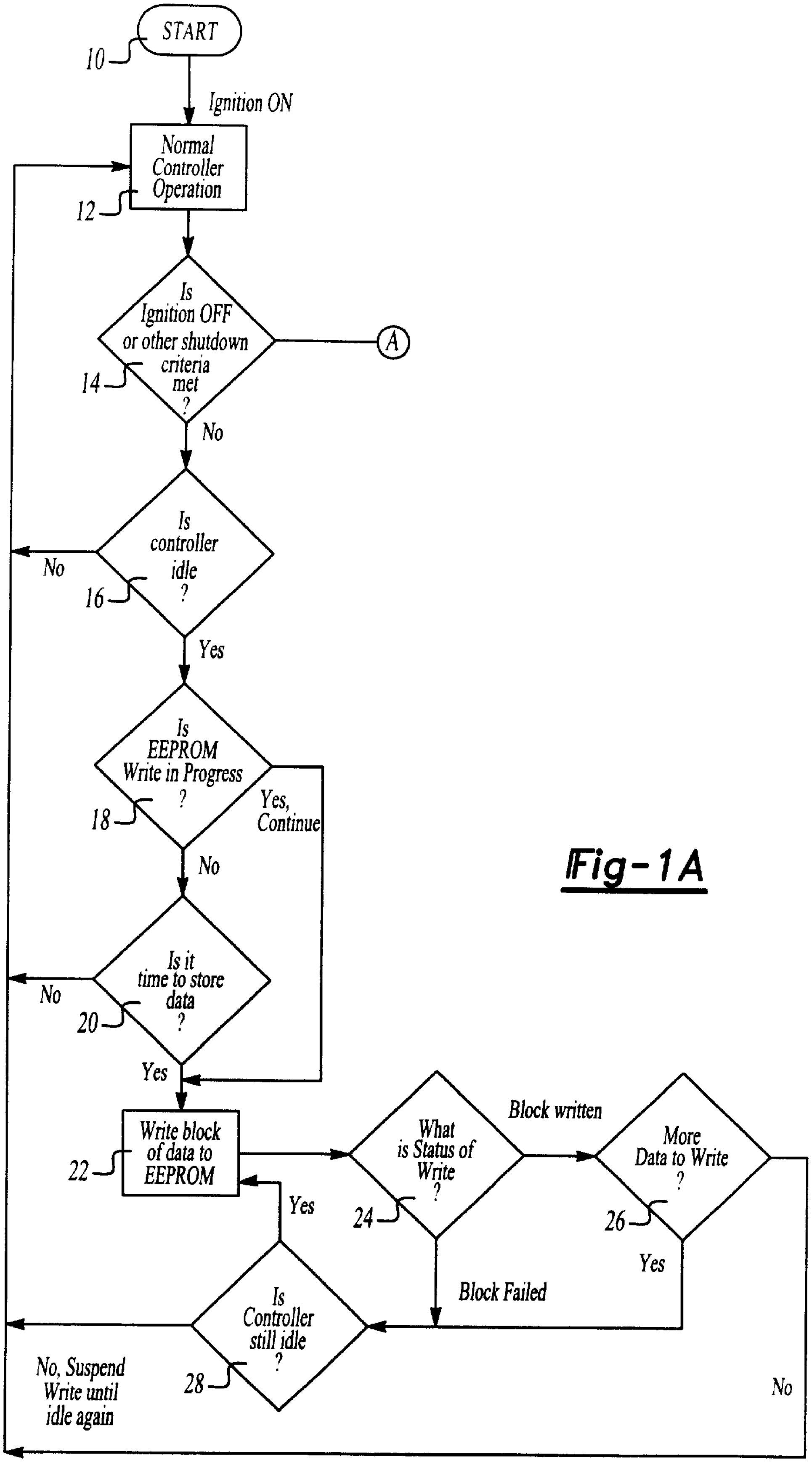
FIG. 1A is a first portion of a flowchart illustrating the steps followed by the controller as it writes data to the EEPROM while the engine is in operation.

Referring now to FIG. 1A, the method of controlling an internal combustion engine including an engine controller having an electronically erasable programmable read-only memory (EEPROM) with a plurality of cells for storing data, and of detecting a gross failure of the memory when the controller attempts to write to the memory upon engine shutdown before entering a low power mode begins at start 10. The flowchart is part of a comprehensive engine operating system. With the ignition of the engine ON, the controller is in its normal operation mode at 12. The controller checks at 14 to determine if the ignition is OFF or if other shutdown criteria such as engine overheating, idle shut downs, or the like are met. If the ignition is not OFF and the other engine shutdown criteria have not been met at 14, the controller is checked to determine if it is idle at 16. If the controller is idle, the system checks to determine if the EEPROM write is in progress at 18. If the EEPROM write is not in progress, the system determines whether it is time to store data at 20. If the EEPROM write is in progress, the system drops down to write a block of data to the EEPROM at 22. If the EEPROM is not trying to store data, the system returns to block 12 maintaining normal controller operation. After being instructed to write the block of data to the EEPROM at 22, the system determines what is the status of the write. If it is determined that the block of data has been successfully written, the system inquires as to whether there is more data to write at 26. If there is more data to write, the system checks to determine if the controller is still idle at 28. If so, the system returns to write another block of data to the EEPROM at 22. If there is no more data to write, the system returns back to normal controller operation at 12.

Figure 1B:
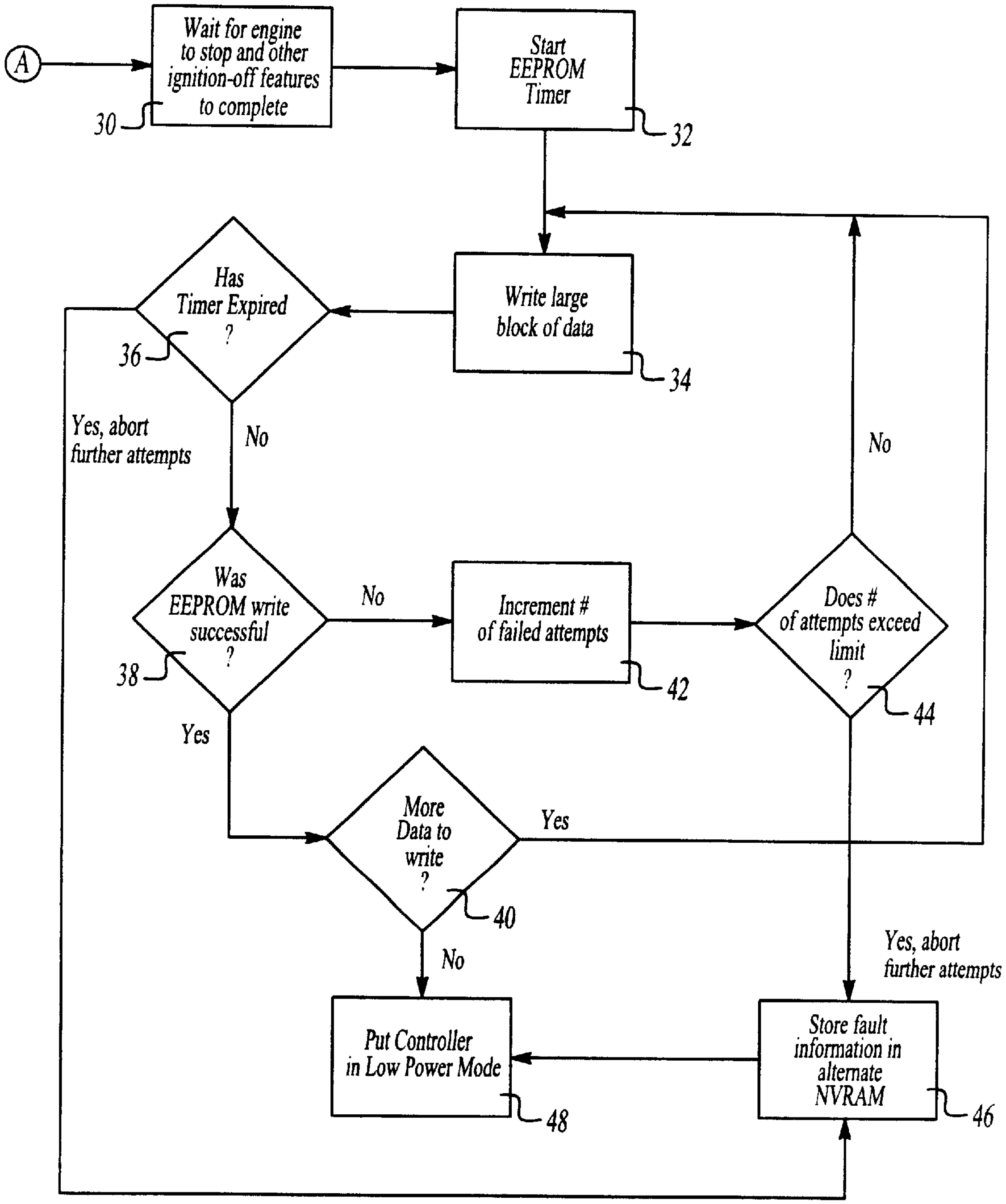
FIG. 1B is a continuation of the flowchart shown in FIG. 1*a* focusing on the EEPROM writing operation during engine shutdown and detection of failure of the EEPROM to prevent delays in switching the engine controller to its low power mode.

Referring now to FIG. 1B, if it is determined that the ignition is OFF or other shutdown criteria have been met at 14, the system waits for the engine to stop and other ignition-OFF features to be completed at 30. When the engine is stopped and the other ignition-OFF features are completed, the system starts the EEPROM timer at 32. The system then writes a block of data at 34. A large block of data may be handled in smaller sets of data. During the time that the large block of data is being written at 34, the system inquires at 36 as to whether or not the timer of block 32 has expired. The timer of block 32 sets a predetermined time that limits the time available for writing data upon engine shutdown. If the timer has not expired at block 36, the system determines at 38 whether or not the EEPROM write was successful by comparing the block of data to be written in 34 to the contents of the EEPROM cell where the block of data was to be recorded. If the EEPROM write was successful, the system inquires as to whether there is additional data to write at 40. If so, the system loops back to write the next block of data at 34. If there is no more data to write, the controller is put in low power mode at 48. If the EEPROM write was unsuccessful at 38, the system may increment a counter that logs each failed attempt at 42. If the number of failed write attempts exceeds a preset limit at 44, the system aborts further writing attempts and stores fault information in alternate non-volatile RAM at 46. The system then puts the controller in its low power mode at 48. The timer in block 32 and counter in block 42 both function to limit re-attempts to write to the EEPROM. Either the counter or the timer may be used or in the illustrated embodiment both a timer and a counter are used in a redundant system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of limiting engine control delays in an internal combustion engine having an electronic engine controller having an operational mode and a low power mode and having an electronically erasable programmable read only memory (EEPROM) for storing data, wherein the delays are caused by an inability of the EEPROM to store data, comprising:

detecting a shutdown condition when the the engine controller is in the operational mode wherein the engine controller receives a request to shutdown the engine and switch to the low power mode;

enabling a timer set to a predetermined time interval;

writing engine shut down data as required by the engine controller to the EEPROM;

determining whether writing of engine shut down data was completed before the predetermined time interval expires; and automatically terminating the data write operation if the predetermined time interval expires and switching the engine controller to the low power mode.

2. The method of claim 1 further comprising determining whether the writing step was successful, incrementing a counter each time the writing step is unsuccessful, when the counter exceeds a predetermined number of unsuccessful writing steps generating a fault message that is stored in non-volatile memory and automatically terminating the data write operation and switching the engine controller to the low power mode.

3. The method of claim 1 further comprising logging in a non-volatile memory a fault message indicating that the EEPROM is non-operational.

4. The method of claim 1 wherein the step of writing engine shut down data is performed on blocks of data.

5. A method of limiting engine control delays in an internal combustion engine having an electronic engine controller, the engine having an electronically erasable programmable read only memory (EEPROM) for storing a plurality of sets of engine shut down data, the engine controller having an operational mode and a low power mode, wherein the delays are caused by an inability of the EPROM to store the sets of engine shutdown data comprising:

detecting a shutdown condition when the an engine controller is in the operational mode wherein the engine controller receives a request to shutdown the engine and switch to the low power mode;

writing one of the sets of engine shut down data as required by the engine controller to the pEPROM to create a stored set of engine shut down data;

determining whether the writing step is unsuccessful by comparing the set of engine shut down data to the stored set of engine shut down data, incrementing a outer and determining whether the counter has exceeded a predetermined limit and generating a fault message when the counter exceeds the predetermined number, and if the counter has not exceeded the predetermined number then repeating the writing step, if the counter has exceeded the predetermined number then automatically terminating the data write operation and switching the engine control module to a low power mode; and determining whether the writing step is successful by comparing the set of engine shut down data to the stored set of engine shut down data, and resetting the counter and determining whether all sets of engine shutdown data have been stored, and if all sets of data have not been stored then repeating the writing step with the next set of engine shutdown data, and if all sets of engine shutdown data have been stored then switching the engine control module to a low power mode.

6. The method of claim 5 further comprising logging in a non-volatile memory the fault message indicating that the BEPROM is non-operational.

7. The method of claim 5 further comprising enabling a timer set to a predetermined time interval;

determining whether writing of engine shut down data was completed before the predetermined time interval expires.

8. A method of providing engine control with engine operation data logging in an EEPROM, comprising:

actuating an ignition switch;

initiating engine controller operation;

enabling engine shut down criteria in the engine controller;

determining whether the ignition switch is turned off and whether engine shut down criteria have been met and generating a signal to stop the engine;

waiting for engine to stop and other ignition off features to be completed;

sending data to EEPROM for writing in EEPROM memory;

determine whether data has been successfully written to the EEPROM;

incrementing a counter when the data is not successfully written to the EEPROM to record a value representative of unsuccessful attempts to write in EEPROM memory;

generating a fault message when the value representative of unsuccessful attempts to write in EEPROM memory exceeds a predetermined value;

storing the fault message in non-volatile memory; and switching the engine controller to a low power mode.

9. The method of claim 8 further comprising:

initiating a timer that is set to a predetermined time interval after the step of waiting for the engine to stop;

determining whether writing of engine shut down data was completed before the predetermined time interval expires; and automatically terminating the data write operation and switching the engine controller to a low power mode.

10. A method of controlling an internal combustion engine including an engine controller having an electronically erasable programmable read only memory with a plurality of cells for storing data, and of detecting a gross failure of the memory when the controller attempts to write to the memory upon engine shutdown before entering a low power mode, the method comprising:

detecting an engine shutdown condition wherein the controller receives a request to shutdown the engine and switch to the low power mode;

executing a write command wherein the controller attempts to write a block of data to the memory in a specific block of cells that is stored as a stored block of data;

reading the stored block of data stored in the specified block of cells;

comparing the block of data to the stored block of data determining whether the stored block of data is the same as the block of data thereby confirming that write command was successful;

determining whether the stored block of data is different from the block of data thereby confirming that write command was unsuccessful and re-executing the write command subject to a re-attempt limit of write commands; and upon reaching the re-attempt limit of write commands, determining a gross failure of the memory.

11. The method of claim 10 further comprising upon determining a gross failure in memory generating a fault message and storing the fault message in a non-volatile memory.

12. The method of claim 10 further comprising upon determining a gross failure in memory, switching the controller to the low power mode.

13. The method of claim 10 wherein the re-attempt limit is set by a timer set to a predetermined time interval.

14. The method of claim 10 wherein the re-attempt limit is set by a counter that counts the number of failed attempts, and wherein upon reaching a predetermined number of failed write commands, the gross failure of the memory is determined.

15. The method of claim 10 wherein a first re-attempt limit is set by a timer set to a predetermined time delay and a second re-attempt limit is set by a counter that counts the number of failed attempts, and wherein upon reaching either the first re-attempt limit or second re-attempt limit the gross failure of the memory is determined.

* * * * *

UNITED STATES PATENT AND TRADEMARK OFFICE

CERTIFICATE OF CORRECTION

PATENT NO. : 6,347,276 B1
DATED : February 12, 2002
INVENTOR(S) : Richard M Avery, Jr.

It is certified that error appears in the above-identified patent and that said Letters Patent is hereby corrected as shown below:

Column 5,
Line 50, delete "EPROM" and insert -- EEPROM --.
Line 57, delete "pEPROM" and insert -- EEPROM --.
Line 62, delete "outer" and insert -- counter --.

Column 6,
Line 14, delete "BEPROM" and insert -- EEPROM --.

Signed and Sealed this

Third Day of September, 2002

*Attest:*

JAMES E. ROGAN

*Attesting Officer*

*Director of the United States Patent and Trademark Office*